United States Patent
Runyan et al.

(10) Patent No.: US 6,546,547 B1
(45) Date of Patent: Apr. 8, 2003

(54) METHOD AND SYSTEM FOR AN AUTOMATED NET BOOTING TOOL

(75) Inventors: Kevin Gregory Runyan, Sunnyvale, CA (US); Kuan-Li Ong, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/400,734

(22) Filed: Sep. 22, 1999

(51) Int. Cl.[7] ................................................. G06F 9/44
(52) U.S. Cl. ......................... 717/124; 717/126; 714/2; 714/4; 714/38; 709/220
(58) Field of Search ............................... 717/124, 126, 717/121; 709/221, 220, 201; 713/1, 2, 100, 150; 714/4, 100, 38, 2

(56) References Cited

U.S. PATENT DOCUMENTS

| | | | |
|---|---|---|---|
| 4,864,569 A | | 9/1989 | DeLucia et al. ............... 714/38 |
| 5,325,532 A | * | 6/1994 | Crosswy et al. ............. 713/100 |
| 5,335,342 A | | 8/1994 | Pope et al. .................... 714/38 |
| 5,414,836 A | | 5/1995 | Baer et al. ..................... 714/38 |
| 5,475,843 A | * | 12/1995 | Halviatti et al. ............. 717/124 |
| 5,634,002 A | * | 5/1997 | Polk et al. ..................... 714/38 |
| 5,751,941 A | | 5/1998 | Hinds et al. ................... 714/38 |
| 5,754,760 A | | 5/1998 | Warfield ....................... 714/38 |
| 5,758,061 A | | 5/1998 | Plum .......................... 714/35 |
| 5,764,593 A | * | 6/1998 | Turpin et al. ................ 709/222 |
| 5,815,654 A | | 9/1998 | Bieda .......................... 714/38 |
| 5,819,093 A | * | 10/1998 | Davidson et al. ............ 717/226 |
| 5,901,315 A | * | 5/1999 | Edwards et al. ............. 717/124 |
| 5,905,856 A | | 5/1999 | Ottensooser ................. 714/38 |
| 5,958,049 A | * | 9/1999 | Mealey et al. ............... 709/321 |
| 5,983,001 A | * | 11/1999 | Boughner et al. ............. 714/38 |
| 6,023,580 A | * | 2/2000 | Sifter .......................... 717/124 |
| 6,071,316 A | * | 6/2000 | Goossen et al. ............. 717/126 |
| 6,163,805 A | * | 12/2000 | Silva et al. .................. 709/221 |
| 6,185,678 B1 | * | 2/2001 | Arbaugh et al. ............... 713/2 |
| 6,195,765 B1 | * | 2/2001 | Kislanko et al. ............... 703/22 |
| 6,279,109 B1 | * | 8/2001 | Brundridge .................... 713/2 |
| 6,279,156 B1 | * | 8/2001 | Amberg et al. .............. 717/124 |
| 6,289,448 B1 | * | 9/2001 | Marsland ....................... 713/2 |
| 6,301,613 B1 | * | 10/2001 | Ahlstrom et al. ............. 709/223 |
| 6,305,010 B2 | * | 10/2001 | Agarwal ...................... 717/126 |
| 6,341,373 B1 | * | 1/2002 | Shaw .......................... 709/203 |
| 6,360,255 B1 | * | 3/2002 | McCormack et al. ........ 370/254 |
| 6,360,268 B1 | * | 3/2002 | Silva et al. .................. 709/221 |
| 6,401,220 B1 | * | 6/2002 | Grey et al. .................... 714/33 |
| 6,473,707 B1 | * | 10/2002 | Grey .......................... 702/123 |

OTHER PUBLICATIONS

Title: Executable Workflows: A paradigm for Collaborative Design on the Internet, Lavana et al, ACM, 1997.*
Title: Internet–based Workflows: A paradigm for dynamically reconfigurable desktop environments, Lavana et al, ACM, 1997.*
Leinwald et al., "Cisco Router Configuration", Maxmillian Technical Publishing, Indianapolis, IN, for Cisco Press, ISBN 1–57870–022–1 (1998). (Table of Contents and Chapter One submitted herewith).

* cited by examiner

Primary Examiner—Gregory Morse
Assistant Examiner—Chameli C. Das
(74) Attorney, Agent, or Firm—Hickman Palermo Truong & Becker LLP

(57) ABSTRACT

The present invention provides a system and method of using highly structured net boot testing through an automated process that produces a highly efficient assurance that each image of a new version of an operating system can operate on any designated platform with any combinations of designated non-platform-specific feature sets. The program images being boot tested have previously undergone functional program testing, regression testing, final test and fix procedures and commit procedures at the levels of the business unit, at an intermediate pre-integration branch level and finally at a primary technology branch of the current IOS source code system before final network boot testing is performed as an antecedent to a regular release of a new version of the IOS.

20 Claims, 13 Drawing Sheets

FIG._1

200 Typical General Purpose Computer/

FIG._3

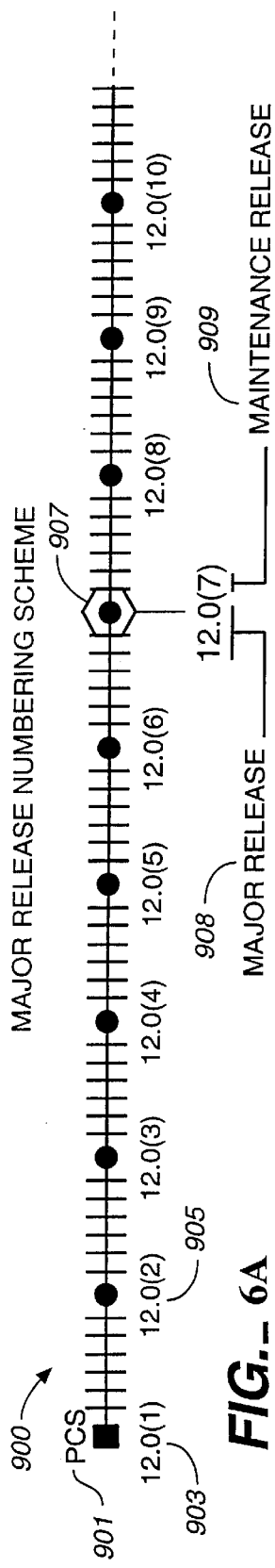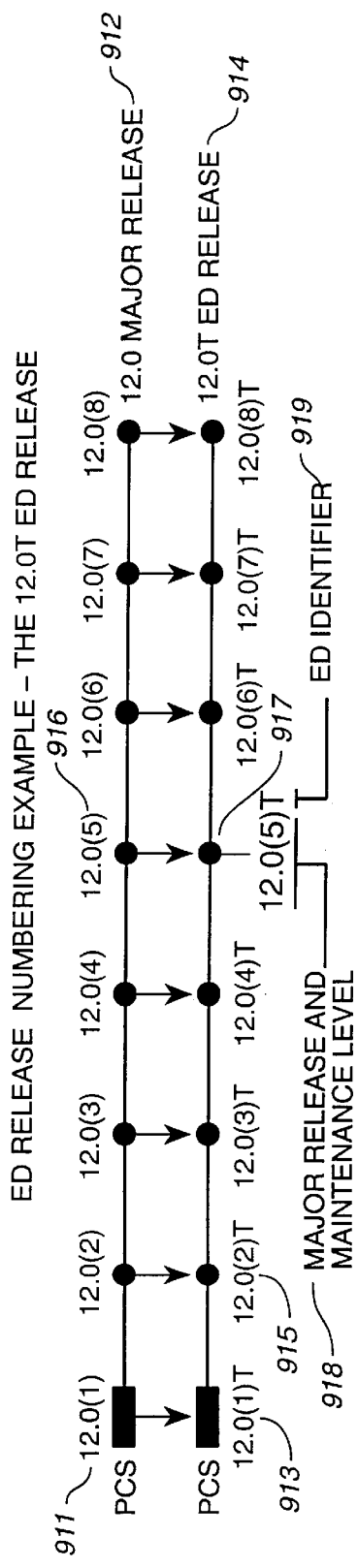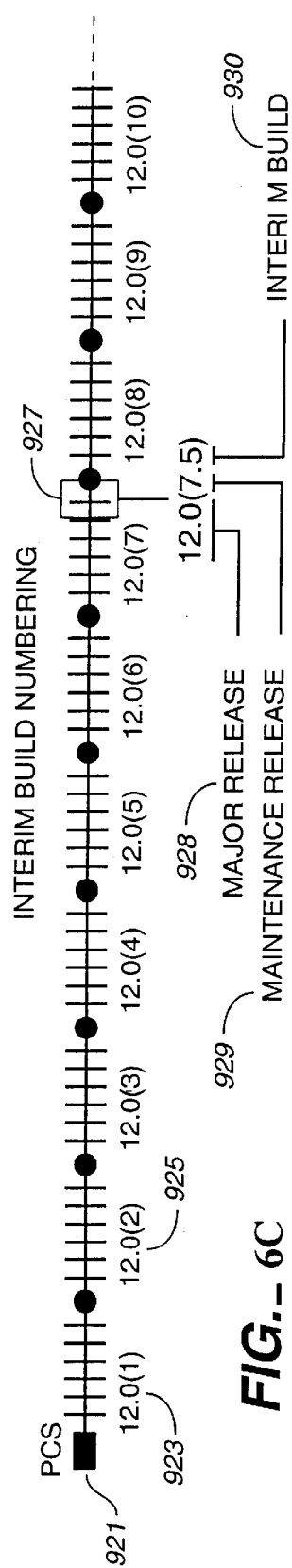
FIG._ 6A  FIG._ 6B  FIG._ 6C

FIGURE 13

```
π
# <platform identifier>:<1st router> <2nd router> ...

as5200:big-as5200 big-as5200-2
c1000:big-1003 big-1003-2
c1003:big-1003 big-1003-2
c1005:big-1005 big-1005-2
c1400:big-1400 big-1400-2
c1401:big-1400 big-1400-2
c1417:big-1400 big-1400-2
c1600:big-1600
c1700:big-1700
c2500:big-2500 big-2500-2 big-2500-3 big-2500-4 big-2500-5
c2501:big-2500 big-2500-2 big-2500-3 big-2500-4 big-2500-5
c2503:big-2500 big-2500-2 big-2500-3 big-2500-4 big-2500-5
c2513:big-2500 big-2500-2 big-2500-3 big-2500-4 big-2500-5
c25fx:big-25fx
c2600:big-2600 big-2600-2
c2610:big-2600 big-2600-2
c2800:big-2800
c2820:big-2800
c2900:big-2900
c3104:big-3000 big-3000-2
c3620:big-3620 big-3620-2
c3640:big-3640 big-3640-2
c3800:big-3800
c4000:big-4000 big-4000-2
c4500:big-4500 big-4500-2 big-4500-3
c516-cs:big-500cs big-500cs-2
c5200:big-as5200 big-as5200-2
c5300:big-as5300 big-as5300-2
c5800:big-as5800
c5rsm:big-c5rsm big-c5rsm-2
c7000:big-7000 big-7000-2
c7200:big-7200 big-7200-2
c7500:big-7500 big-7500-2
c800:big-800
c801:big-800
cpa3620:big-3620 big-3620-2
cpa3640:big-3640 big-3640-2
dsc:big-dsc-as5800
gs7:big-7000 big-7000-2
igs:big-igs big-igs-2
mc3810:big-3810 big-3810-2
rsp:big-7500 big-7500-2
ubr7200:big-ubr7200
ubr900:big-ubr900
xx:big-4000-2
```

METHOD AND SYSTEM FOR AN AUTOMATED NET BOOTING TOOL

TECHNICAL FIELD

This invention relates to the field of software systems testing. More particularly, the present invention relates to a method and system for using an automated net booting mechanism for testing a multiplicity of images of a software system in a multiplicity of different platforms in a highly efficient manner.

BACKGROUND ART

Typically in a large software development project, many programmers or programming groups work in conjunction with one another to develop a single piece of software. Moreover, in today's distributed environment, using local area networks (LAN) as well as wide area networks (WAN), these various programmers and programming groups may be spread around the world.

In today's hectic technology environment, software developers rush to get original product releases to market, followed by the inevitable "bug-fix" revisions, new feature releases, and extensive upgrades in a never ending cycle. Extensive use of Object Oriented Programming (OOP) techniques have added several levels of complexity to the configuration management task. Some large hardware companies, whose product sales are dependent on related software supporting new hardware features, add an additional pressure on software developers to rapidly modify existing software and produce new feature releases. Such shorter release cycles increase the need for development groups to engage in parallel development. However dividing project efforts among multiple developers or teams can lead to problems with software integration, reoccurring bugs, and lost changes. In such an environment of complex software, multiple platforms, globally dispersed development groups, the need for automating the control of new system development testing and building of related system images has become a necessity for survival.

Moreover, to satisfy the differing requirements of different customers in the exploding telecommunications market, it is required for manufacturers of network switches and routers as well as other devices to offer different operating system images containing different platform specific capabilities as well as different non-platform-specific features and protocols. Businesses which manage Internet and Intranet networks are constantly seeking less expensive equipment such as switches, routers, servers and client terminals. Such demands for less expensive equipment drives manufacturers to constantly create new and more desirable platforms. At the same time many of these businesses are simultaneously seeking new features which are platform independent to accommodate the exploding demands of their customers. Such demands include desires for more bandwidth, faster transmission protocols, more content security features such as cryptographic protocols, etc., etc. At the same time these businesses do not desire to pay for features which they do not need or want if at all possible. To accommodate such requirements, systems manufacturers develop "products" which contain separate combinations of such non-platform-specific features, which sell for various prices and which users can select for their particular platforms.

Such demands for new hardware platforms and new telecommunications features have led telecommunications systems suppliers such as Cisco Systems, Inc.™ (the assignee of the present invention) as well as others, to develop a sales strategy which dictates frequent releases of new hardware platforms and new feature software. This process places enormous pressure on the software developers to design, code and test new software to support the new hardware platforms and the new features, including protocols, and other special system features. All of these new software capabilities must ultimately be folded into the common Internetworking Operating System (IOS) which runs on all of the applicants switches and routers. Such demands can result in hundreds of new system images which result from a new version release and which must be tested prior to release to the customers. That is applicant may support 30 or 40 platforms with 10 or more feature packages for each platform.

The technical problem addressed by the current invention relates to this issue of how to efficiently perform the final booting test of the new images of an operating system which contains new code for new hardware platforms, for various combinations of non-hardware-specific new features, and bug-fixes, wherein the images which are to be boot tested number in the hundreds and wherein such boot testing must be completed as rapidly and as efficiently as possible.

There is a need in the art for a method and system for orderly and efficient boot testing of a multiplicity of operating system images in a matter of hours as opposed to days. This becomes especially critical in a system wherein release of new versions of software occurs frequently (as often as every 8 weeks), and wherein the new versions contain code of the highest quality for a multiplicity of hardware platforms and a multiplicity of non-platform specific new features resulting in hundreds of different combinations of platform and feature sets to be tested.

SUMMARY OF THE INVENTION

The present invention provides a solution to the needs described above through a system and method of using highly structured net boot testing through an automated process that produces a highly efficient assurance that each image of a new version of an operating system can operate on any designated platform with any combinations of designated non-platform-specific feature sets and can be boot loaded via the Internet. The program images being boot tested have previously undergone functional program testing, regression testing, final test and fix procedures and commit procedures at the levels of the business unit, at an intermediate pre-integration branch level and finally at a primary technology branch of the current IOS source code system before final system boot load testing is performed as an antecedent to a regular release of a new version of the IOS.

A system is disclosed for providing net boot testing of multiple images of early deployment releases of a software system, the early deployment releases containing support for new features and platforms. Each image is boot load tested for the specific platform for which it is intended.

A method is disclosed for a net boot testing process wherein a list of program images to be tested is selected along with a list of available test platforms to use in testing the images, and wherein the individual images are boot load tested via the Internet against their specified platform devices.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

BRIEF DESCRIPTION OF THE DRAWINGS

The features and advantages of the system and method of the present invention will be apparent from the following description in which:

FIGS. 6a through 6c illustrate diagrams showing the basic release numbering scheme used in the preferred embodiment.

FIG. 13 depicts an exemplary list of test bed routers used in a preferred embodiment.

DETAILED DESCRIPTION OF THE INVENTION

Figure 1:
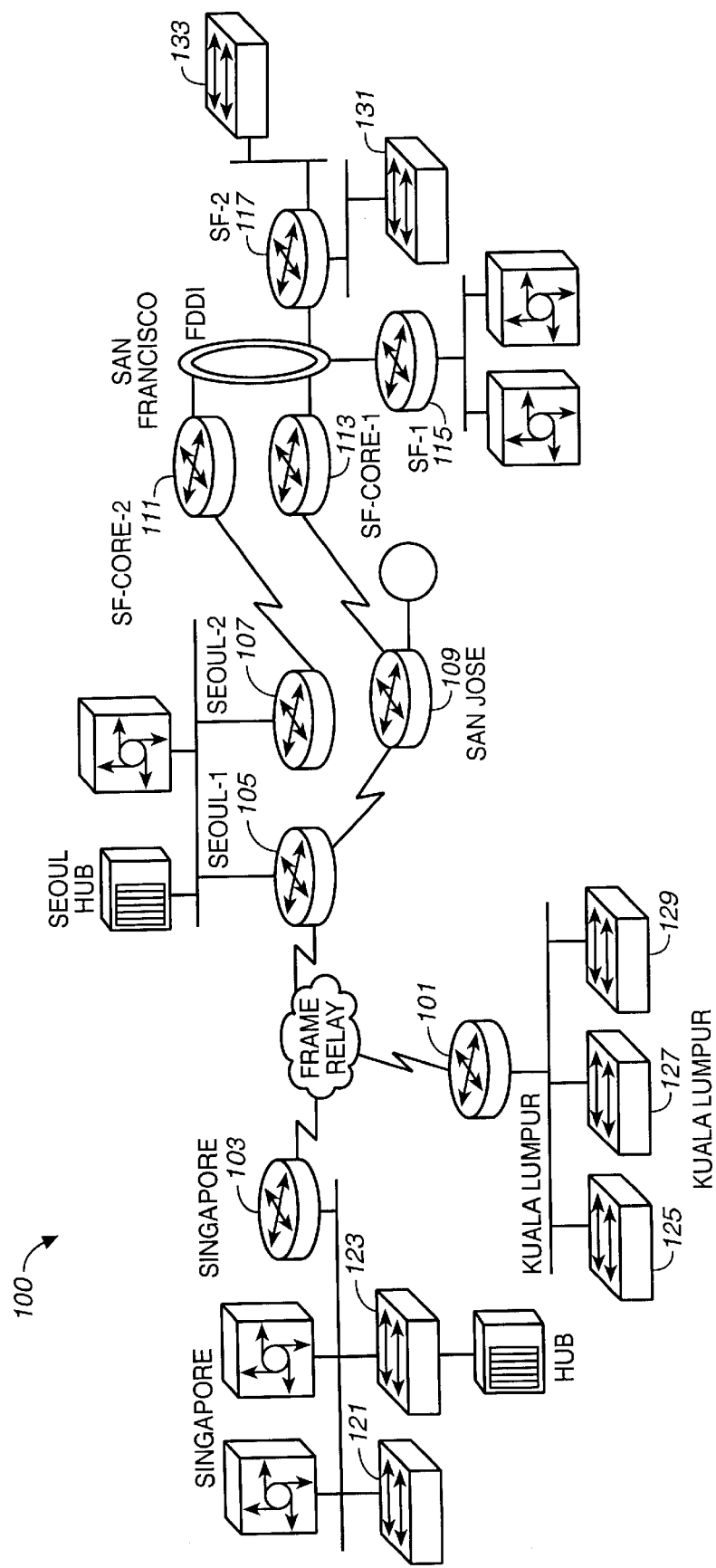
FIG. 1 illustrates an exemplary internetwork which illustrates the use of switches and routers.

The present invention provides a solution to the needs described above through a system and method of using highly structured net boot testing through an automated process that produces a highly efficient assurance that each image of a new version of an operating system can operate on any designated platform with any combinations of designated non-platform-specific feature sets. The program images being boot tested have previously undergone functional program testing, regression testing, final test and fix procedures and commit procedures at the levels of the Business Unit, at an intermediate pre-integration branch level and finally at a primary technology branch of the current IOS source code system before final system boot testing is performed as an antecedent to a regular release of a new version of the IOS regularly, approximately every 8 weeks.

In the following description for purposes of explanation, specific data and configurations are set forth in order to provide a thorough understanding of the present invention. In the presently preferred embodiment the Internetwork Operating System (IOS) automated Boot Testing system is a part of the release process used by applicants in connection with a Reliant™ ClearCase™ configuration management system. However, it will be apparent to one skilled in these arts that the present invention may be practiced without the specific details, in various software configuration management applications, using any number of modem software configuration management systems. In other instances, well-known systems and protocols are shown and described in diagrammatical or block diagram form in order not to obscure the present invention unnecessarily.

ADDITIONAL BACKGROUND INFORMATION

Basic system related definitions which are not defined elsewhere in this document and which are used herein include the following:

A bridge is a network device that operates on the "data link layer" (a layer in the OSI Reference Model). A bridge connects multiple data link network segments into a single logical network segment. A Cisco Internetworking Operating System (IOS) image resides in a bridge and implements various types of bridging protocols.

A switch is a multiport bridge that also runs the IOS. A switch may have more ports than a bridge, cost less per port than abridge, and possesses embedded management functions that a bridge does not have.

A router is a device that detects packets through the network based on network layer information. A router understands the network layer addressing (based on various kinds of network layer protocols such IP, IPX, AppleTalk, etc.) in a packet and uses routing protocols to determine the route that a packet should take to reach its destination. All of these functions are also controlled by a version of the IOS in the router.

A bridge or switch connects two or more physical networks into a single logical network, while a router connects two or more logical networks and routes between them using information that is built by routing protocols and kept in routing tables.

A release is a version of a software system that is produced, usually in object code form, for delivery to a customer. As used herein, the term "release" has two meanings. "Release" can refer to the first shipment of a product, along with all its subsequent maintenance updates. For instance, 12.0(1), 12.0(2), 12.0(3) and all subsequent maintenance updates are collectively called the "12.0 Release." A particular maintenance update can also be called a "release," as in the "12.0(3) release." In this document, "Release" with a capital "R" indicates the first encompassing usage, and "release" with a small "r" indicates the second more narrow usage.

Types of Releases. There are two main types of Cisco IOS Software releases: Major Releases, which support a fixed set of features and platforms through the life of the release; and Early Deployment Releases, which deliver support for new features and platforms in their regular maintenance updates.

General Deployment

When a Major Release is deemed appropriate for general, unconstrained use in customers' networks, it is said to have reached General Deployment (GD). While all releases undergo significant internal and external testing prior to FCS, a vendor is typically unable to anticipate and test all customer network configurations. For that reason, the initial releases of software deployed in customer networks is closely monitored to ensure that it meets customers' needs, and fixes to the software are delivered via regularly scheduled maintenance releases. Thus early releases of such software have some risk of failure until it has been in full use in various customer environments for a period of time. In the preferred embodiment a release meets the GD milestone (and accordingly has minimum risk of failure) when Cisco is satisfied that the release has been:

Proven through extensive market exposure in diverse networks

Quantified with metrics analyzed for stability and bug trends

Qualified through customer satisfaction surveys

Once a maintenance update for a particular Major Release achieves GD, all subsequent maintenance updates for that Release are also said to be GD.

Early Deployment Releases (ED) as a group are based on Major Releases of IOS Software. In the preferred embodiment, ED Releases are a vehicle to quickly deliver new functionality, addressing the need for early availability of product. These Releases provide new technologies for customers to deploy in a limited manner in their networks.

Note that similar functionality may be available on more than one ED Release. For example, a platform may be introduced initially on the 11.1 AA Release. Support for this platform may also be included in an ED Release based on 11.2, say the 11.2P Release. Since 11.2P is based on the 11.2 Major Release, the platform will support additional 11.2 features when deployed on the 11.2P Release. (See below for an explanation of Early Deployment Release numbering.)

In the preferred embodiment, Maintenance updates for an ED Release usually deliver support for additional platforms or features, beyond what was available at the Release's FCS. While the addition of platforms and features at maintenance releases can have a destabilizing effect on the release, Early Deployment maintenance releases are subject to the same level of testing as the maintenance releases for Major Releases.

In summary, maintenance releases for an ED Release may deliver any or all of the following:

Bug fixes for the Major Release-based features on which the ED is based

Bug fixes for the ED-unique features

Support for additional platforms or features

Early Deployment Release Numbering

The Early Deployment Release number identifies the Major Release and maintenance level, in addition to information unique to the ED Release. In general, Early Deployment Releases are differentiated from Major Releases by the use of capital letters in their names. For instance, 11.2 is a Major Release, whereas 11.2P and 11.2BC are Early Deployment Releases.

Example —The "12.0T" ED Release

FIG. 6 below, there is an ED Release called 12.0T 914 which is based on the Major Release 12.0. 912 Underlined is a specific maintenance release for 12.0T, numbered 12.0 (5)T 917. This number indicates the following:

The 12.0T Release 914 is based on 12.0 912.

The 12.0(5)T 917 maintenance release has incorporated all bug fixes which have been made to the 12.0 Release through the fifth maintenance release—It is equivalent to 12.0(5) 916 with respect to maintenance activity on the 12.0 code base.

The 12.0(5)T 917 maintenance release includes any additional functionality and bug fixes introduced on previous maintenance releases of the 12.0T Release.

The 12.0(5)T 917 maintenance release may include new functionality not previously introduced in maintenance releases of the 12.0T Release.

Interim Builds

As part of the normal development process, interim builds incorporating bug fixes are created between maintenance releases. Each interim build is usually tested in a limited manner. Fixes in the interim builds are incorporated in the subsequent maintenance release, which is fully regression tested. Numbering of interim builds is also shown in FIG. 6, for example the interim build system designated 12.0(7.5) 927 wherein the 12.0 refers to the major release involved 928, the 7 refers to the maintenance release 7 929 or more specifically 12.0(7), and the 0.5 refers to the interim build designator 930.

A branch is generally a specified configuration of source code files. The first configuration of a new release is generally designated the Main Branch or Parent branch. Subsequently subsets or supersets of this Main Branch may be created and will be called by a specific name, such as a "maintenance Branch" or a "Throttle Branch" or an "early development release" branch.

An operating system image is defined as a given load module for a specific feature set and IOS release executable on a specific type device. In the preferred embodiment, an image is designated for example as "C1000-ajvs-120-12.3" where C1000 is the platform or device, ajvs is the unique feature family, 120 is the IOS release version (i.e. 12.0), and 12.3 designates a specific feature set

THE OPERATING ENVIRONMENT OF THE PREFERRED EMBODIMENT

The environment in which the present invention is used encompasses the development of operating system program images for network switches and routers manufactured and sold by Cisco Systems Inc.™, the assignee of the present invention. These switches and routers are used in the general distributed computing scene which includes generally local area networks with hubs, routers, gateways, tunnel-servers, applications servers, etc. connected to other clients and other networks via the Internet. Some of the elements of a typical internet network configuration are shown in FIG. 1, wherein an example Internetwork is shown. This example Internetwork is taken from the book titled "Cisco Router Configuration" by Allan Leinwand, Bruce Pinsky and Mark Culpepper, published by Macmillan Technical Publishing, Indianapolis, Ind. 46290 for Cisco Press, ISBN:1-57870-022-1, which is hereby incorporated fully herein by reference. Referring to FIG. 1 the example internetwork 100 pictures a number of routers 101, 103, 105, 107, 109, 111, 113, 115 and 117 in various portions of the network located in a number of different physical locations. It is to be noted that each of these routers contains a Cisco Internetwork Operating System (IOS) and each of these platforms may have different platform-specific features as well as different non-platform-specific features. Similarly, a number of Cisco switches 121, 123, 125, 127, 129, 131 and 133 are shown in various locations. These switches also contain a Cisco Internetwork Operating System (IOS) and each of these platforms may have different platform-specific features as well as different non-platform-specific features.

Figure 2:
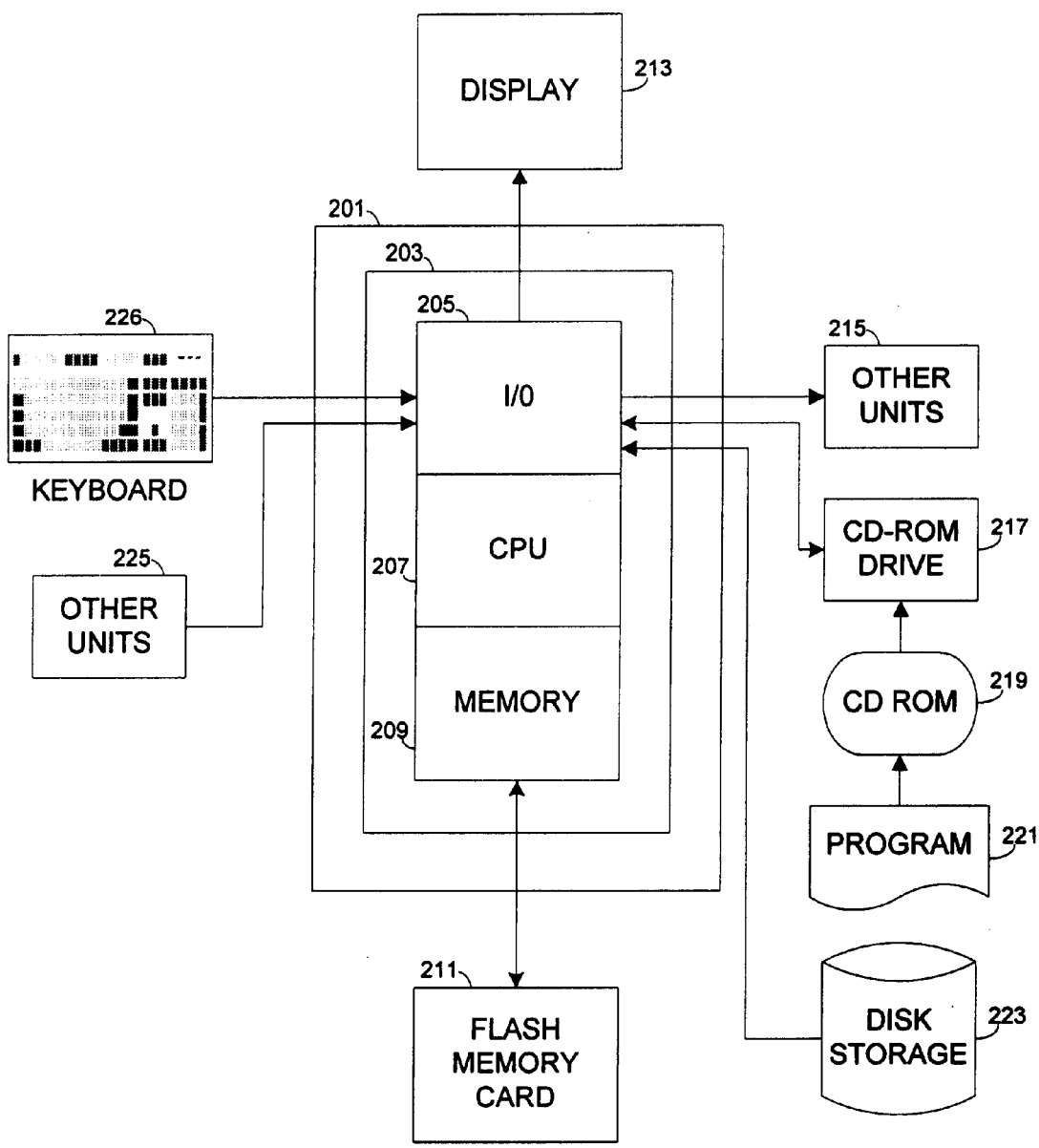
FIG. 2 illustrates a representative general purpose computer client configuration.

Portions of the present system may be performed using a general purpose computer unit which typically includes generally the elements shown in FIG. 2. The general purpose system 201 includes a motherboard 203 having thereon an input/output ("I/O") section 205, one or more central processing units ("CPU") 207, and a memory section 209 which may have a flash memory card 211 related to it. The I/O section 205 is connected to a keyboard 226, other similar general purpose computer units 225, 215, a disk storage unit 223 and a CD-ROM drive unit 217. The CD-ROM drive unit 217 can read a CD-ROM medium 219 which typically contains programs 221 and other data. Logic circuits or other components of these programmed computers will perform series of specifically identified operations dictated by computer programs as described more fully below.

A preferred embodiment of the present invention will be described in terms of a UNIX™ Workstation with the Solaris™ operating system and the assumption is that the workstation has at least a minimum configuration as follows:

Sun™ SPARC™ 5

SunOS 5.5.1

96 megs memory

170 MHz cpu.

This workstation is used primarily for the display and control commands while the Net Boot Testing tool is running on one or more servers, similarly running SunOS 5.5.1 with various amounts of memory and processor speeds. Those skilled in these arts will recognize that the invention can be run on any number of processors with relatively equivalent services and will provide more or less efficient testing depending on the processor and memory characteristics of the machines used.

In the preferred embodiment, the testing of IOS images is performed in a laboratory setting having at least one copy of each platform device supported interconnected to the automated boot loader workstation controller. In the preferred embodiment, an exemplary list of platforms in the test bed are shown later in this description.

ADDITIONAL DETAILS OF THE PREFERRED EMBODIMENT

Figure 3:
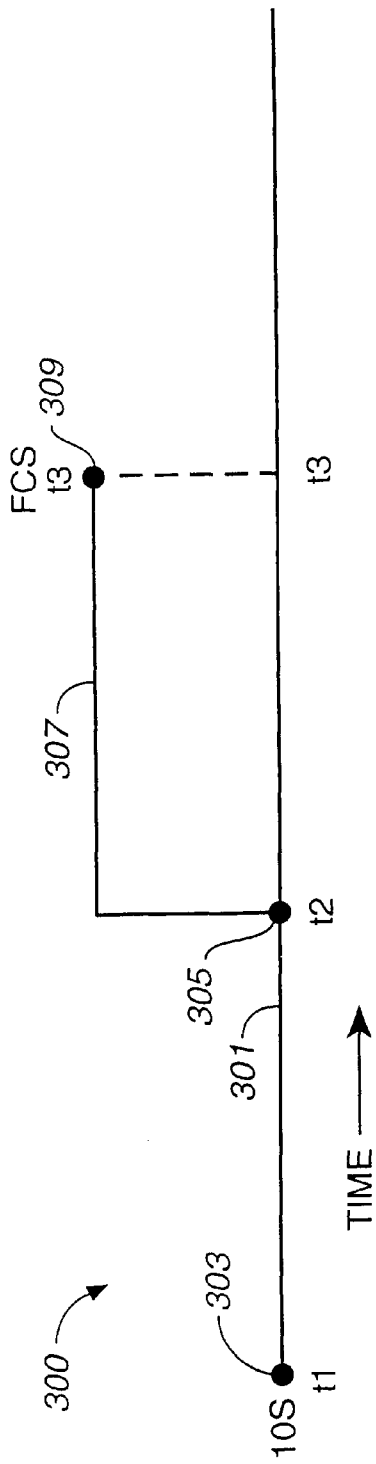
FIG. 3 illustrates a representative diagram used in this application to depict a basic Internetwork Operating System (IOS) source code tree structure which illustrates a main branch, a control branch and the release point for a new version

Referring now to FIG. 3 some additional key concepts used in the following description of the preferred embodiment are outlined. In the general case discussion, a chart 300 such as is shown is used. The line 301 depicts the "main branch" starting at some time "t1." 303 As time progresses, changes are made to this source code file to add bug-fixing code to this baseline configuration 301. Typically at some time "t2" 305 a new branch 307 (call it a "throttle branch") is created wherein new platform specific code and new feature code is added and tested. Additionally, during the period t2–t3 any bug-fix code inserted into the main branch is also inserted into the throttle branch and tested there as well. When testing here 307 by the test group has reached a steady state, the "Build" group is required to generate binary IOS images of each platform load module in combination with each of the various non-platform-specific feature sets. The build group then must perform a boot test to insure that each IOS image created will load into the given platform properly. It is this boot load testing operation which is the subject of the current invention. Ultimately, when the new code in the Throttle branch has been tested as thoroughly as practicable, this version is "released" to the customers at time t3 and this release event is typically called a "First Customer Shipment" (FCS) 309 of this particular configuration.

Figure 4:
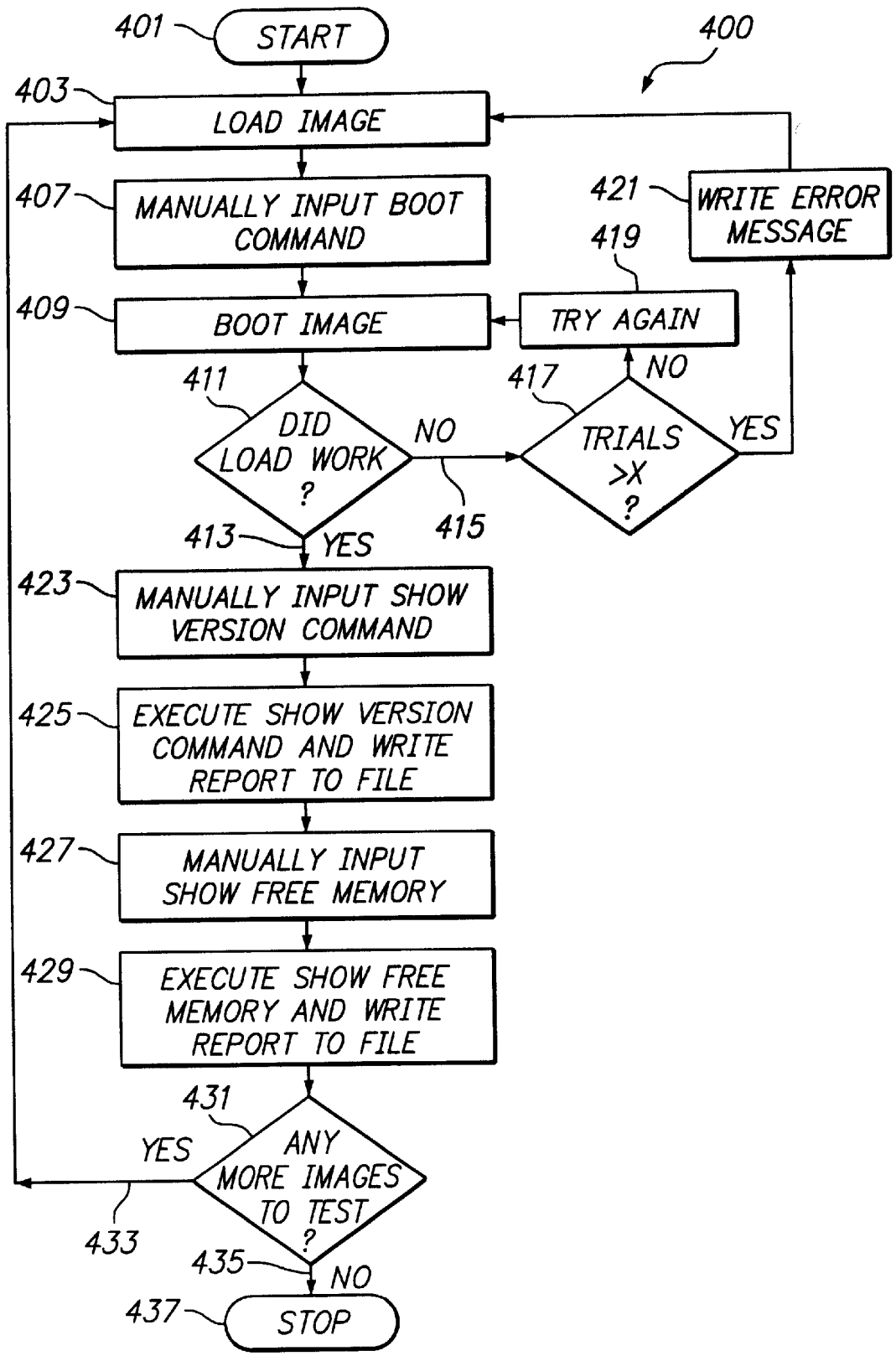
FIG. 4 illustrates a block diagram of the prior art process of boot testing the multiple images of a new release.

Referring now to FIG. 4 the prior art manual boot load testing process 400 is described. In FIG. 4 the testing process begins with compiled copies of all possible images for the current release loaded into a file at location "tftpboot." For example, in a recent release the number of images to be boot tested was 350 with 25 platforms being represented. In the manual testing process of the prior art as many as 5 test engineers would work for 2–3 days to test this number of images, with each test engineer given a designated number of images to test and with each engineer performing the following process. Initially a designated image is loaded 403 by calling for example telnet <router.name> for example telnet (big-c100-con).

This command gives the user a console on the router.

Then a manual command to boot this image into a given device is entered 407 by the test engineer and the boot load is attempted 409. If the boot load worked 411, 413 then the engineer entered a command to "show the version" data 423 which was executed and the "show version" data written to a report file 425. An example of the "show version" data is as follows:

Cisco Internetwork Operating System Software

IOS (tm) 1000 Software (C1000-Y-M), Version 12.0(5.1),

Maintenance Interim Software

Copyright (c) 1986–1999 by Cisco Systems, Inc.

Compiled Mon Jun. 21, 1999 14:21 by phanguye

Next the test engineer would enter a "show free memory" command 427 and the system would execute the command and write the data to a report file. 429 An example of the "show free memory" data is shown in the Appendix 1.

Next the test engineer would determine whether there were more images to test 431 and if not 435 then he/she was finished 437.

If there were more images to test 433 then he/she would load the next image 403 and repeat the process.

Returning to block 411 where a determination was made as to whether the attempted boot load worked, if the attempt failed 415 the test engineer would determine whether the boot attempt had been tried the specified number of times. 417. If the answer was yes then an error message was written 421 and another image was loaded for testing 403. If the boot load attempt had not been tried the specified number of times then another attempt to boot the image 409 was made.

As indicated above this process was very labor intensive and even with 5–7 test engineers the number of images to be boot load tested would take several days.

THE INVENTION

Figure 5:
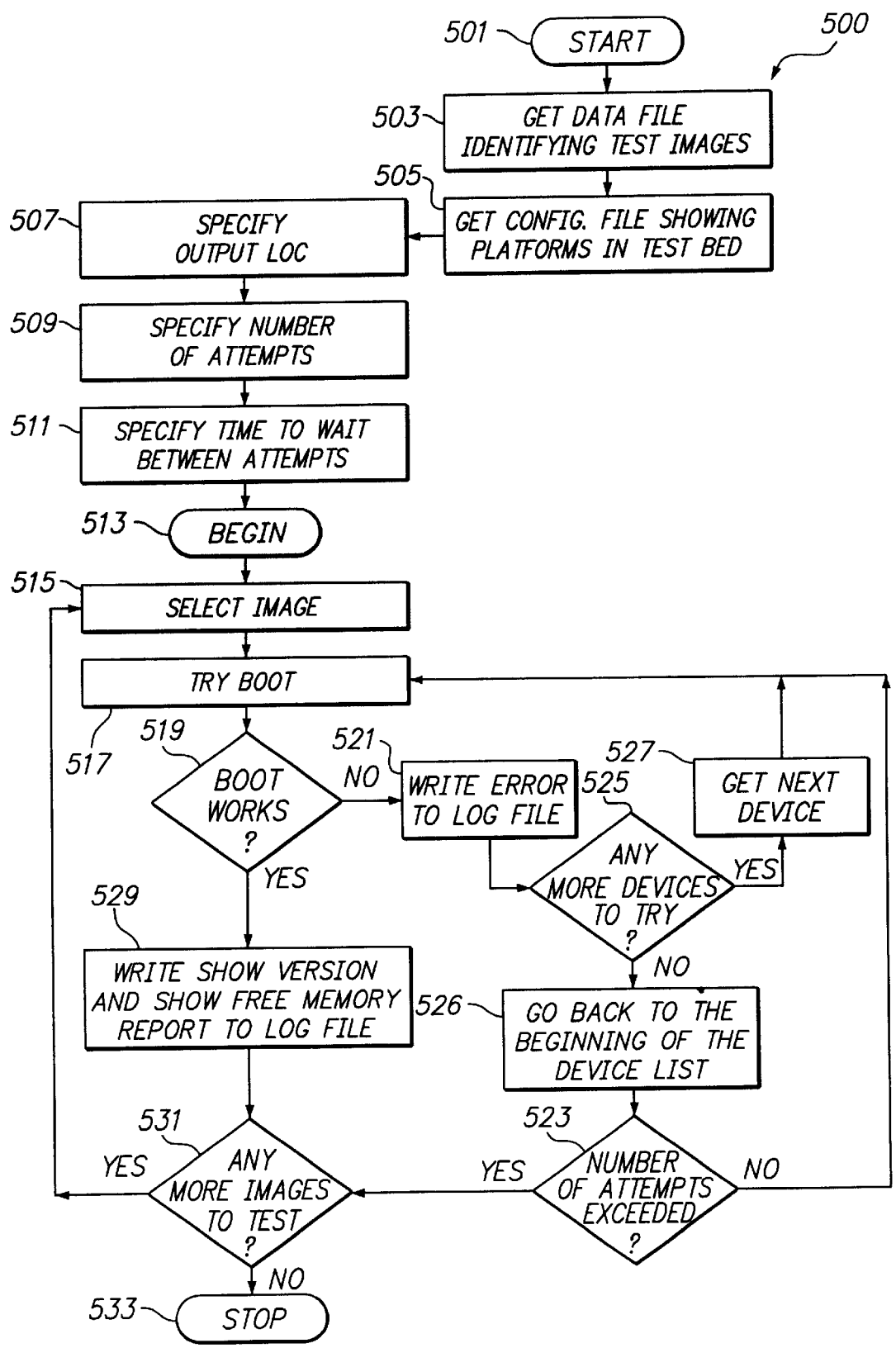
FIG. 5 illustrates a flow-chart of the preferred embodiment process for managing the process of boot testing the multiple images of a new IOS version release.

The preferred embodiment of the current invention is now described with reference to FIGS. 5–12. Referring now to FIG. 5, in contrast to the scheme shown in 400 a new process 500 uses an automated boot load program. The preferred embodiment will be described in functional steps and amplified with specific exemplary detail with reference to the screen shots shown in FIGS. 7–12. In the preferred embodiment the process begins by getting a data file 503 which contains the reference data used to identify the specific release version and revision numbers. These unique value pairs are used to determine the images to boot and are also used to evaluate banner information and log file creation. This example would be for the 12.0 (5.1) interim release.

**\*\*\*\*\*\*\*\*\*\*\*\*\*\*\*\*\* 12.0 DATA FILE \*\*\*\*\*\*\*\*\*\*\*\*\*\*\*\*\*\***

12.0(5.1) datafile is for connecticut branch release only

**\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*** bootver=12.0 bversion=120 bu_name=1.2 orgsysrev=5.1 sysrev=5.1 sysver=120

Next the system gets the test bed configuration file 505 which indicates the routers available and associates available routers with their associated platforms. Each unique platform has a list of 1 or more compatible routers. Some routers appear for different platforms as these routers can boot various platforms successfully. The format is <platform identifier>:<1st router><2nd router> as for example c1000:big-1003 big-1003-2

FIG. 13 contains an exemplary list of the test bed routers used in a preferred embodiment.

Also specified at this time if appropriate is a location of an "Image Exclusion file." This image exclusion file is a list that allows entire platforms to be skipped in the testing or specific images to be skipped. These would be images and platforms that for some reason or other should not be booted at all. The following example of such an exclusion list would allow all releases to skip "rsp-ajsv-mz" images. It would also allow all releases to skip all images on platforms "rvip", "svip", cpa3620", and "cpa3640."

Image Exclusion File Content Example rsp-ajsv-mz rvip svip cpa3620 cpa3640

Next the test engineer specifies the output location for the results 507, specifies the number of attempts to load each image 509 (say 3 or 4 for example) and specifies a wait time between attempts. 511 This wait occurs only after an image has been attempted and failed on all routers for a given unique platform. This wait will be bypassed if any of the boot attempts are successful.

At this stage the test engineer can cause the automated boot load tester to begin 513. Note that the steps described in FIG. 5 steps 515–533 inclusively are run multiple times in parallel. That is steps 515–533 are run for all images of a specific platform. For example, all c1000* images will go through steps 515–533 on routers big-1003 and big-1003-2 (see line "c1000:big-1003 big-1003-2" in FIG. 13). Also, running in parallel to the c1000 process would be all c4500* images going through steps 515–533 on routers big-4500, big-4500-2 and big-4500-3. (See FIG. 13) And so on in parallel for all platforms in which images exist for the given release.

The automated tester selects an image to be tested 515 and selects an appropriate platform and tries to load it. 517 If the boot load works the system writes the "show version" and "show free memory" reports to the designated file. 529 If there are no more images to test the process is finished. 533 If there are more images to test the system selects the next image 515 and repeats the process.

Returning to block 519 if the boot load failed an error report is written 521 to the designated file. 521 Then the system asks whether there are any other devices of this type available in the lab with which to try this boot load. 525 If there are not any other equivalent devices available then the system goes back to the beginning of the device list 526 and then asks whether the number of attempts to load this image into this platform has been exceeded. 523 If so the system returns to block 531 to see if additional images remain to be tested and proceeds as before. If at block 525 there are additional equivalent devices available the system gets another device 527 and tries the boot load again continuing at block 517 as before. Also returning to block 523 if the number of attempts had not exceeded the maximum number the system would wait the designated time for the device to recycle and try the boot load again at block 517.

With this automated boot load test system the aforementioned manual testing of 350 images which took roughly 120 man hours (5 test engineers over 3 days), is accomplished using the present invention in approximately 3–4 hours.

This structured release process, wherein new versions of the software product are released frequently (as often as every 8 weeks), in an environment of a multiplicity of platform devices and a multiplicity of non-platform-specific features, requires efficient testing procedures at each step of the release process. The automated boot load testing process of the present invention is new and novel in the art. While the preferred embodiment has been described in terms of functional steps and specific formats and hardware used in the description of the best mode, those skilled in these arts will recognize that these functions can be implemented in a multiplicity of ways. Those skilled in the art will recognize that the optimum release frequency will vary as a function of the availability of new hardware devices and new protocols and communications features desired by customers as well as with a vendors resources for developing, testing, controlling and releasing the new software to support these new platforms and features. The time required for testing a given number of IOS images will similarly vary with the number of device types available in a given vendor's or customer's test laboratory.

EXAMPLES

Figure 7:
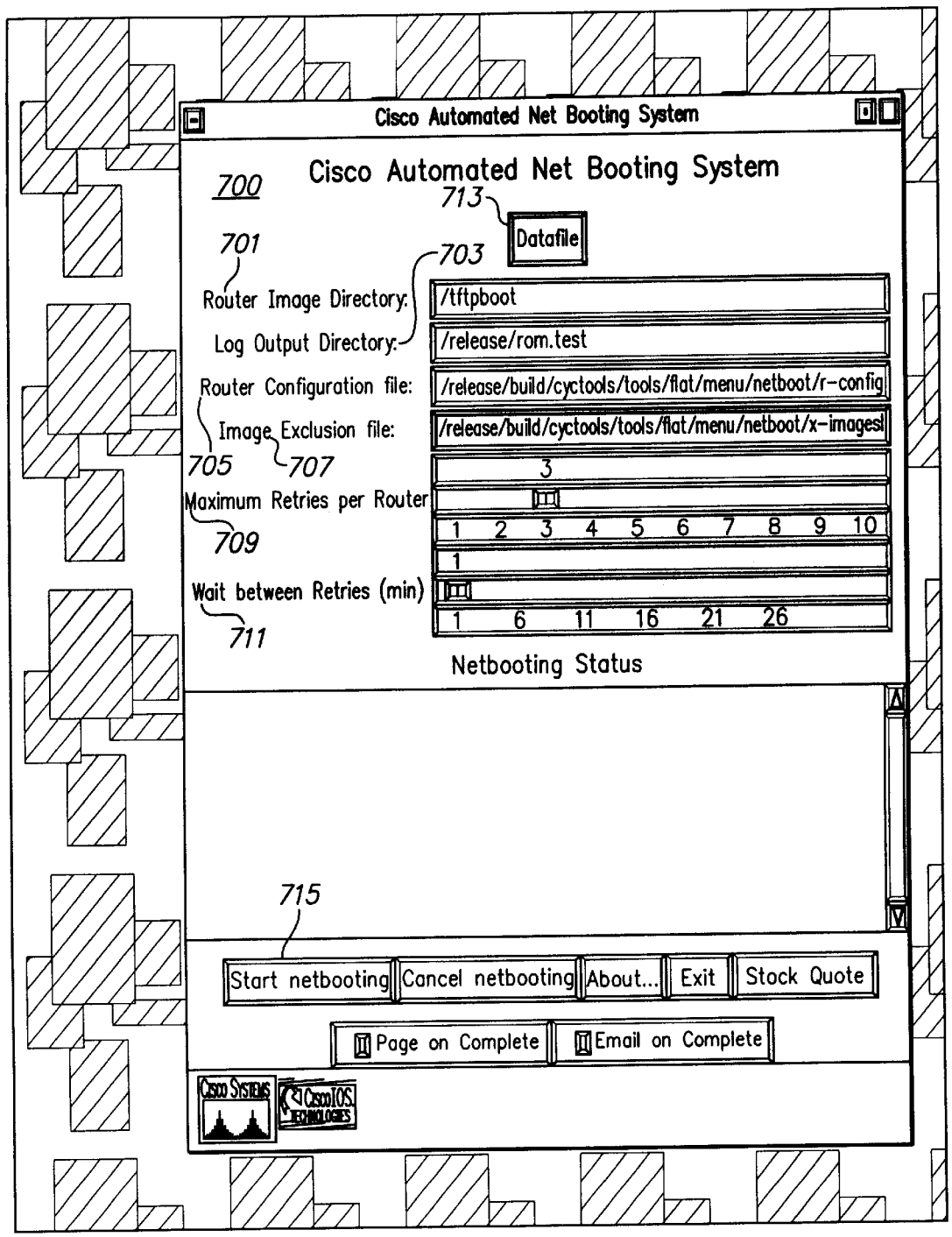
FIGS. 7 through 12 illustrate screen shots of an example of the process of the preferred embodiment.
Figure 8:
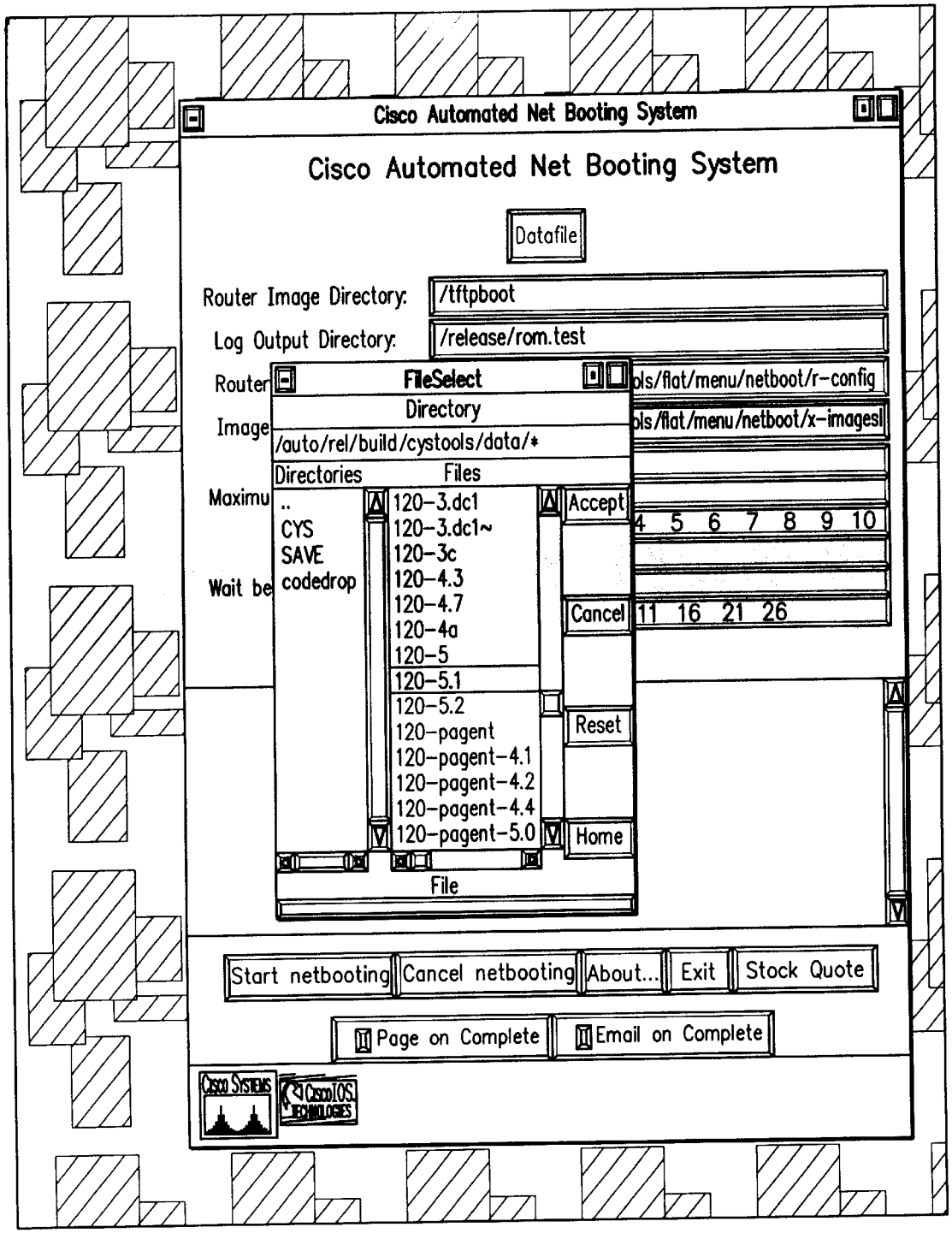
Figure 9:
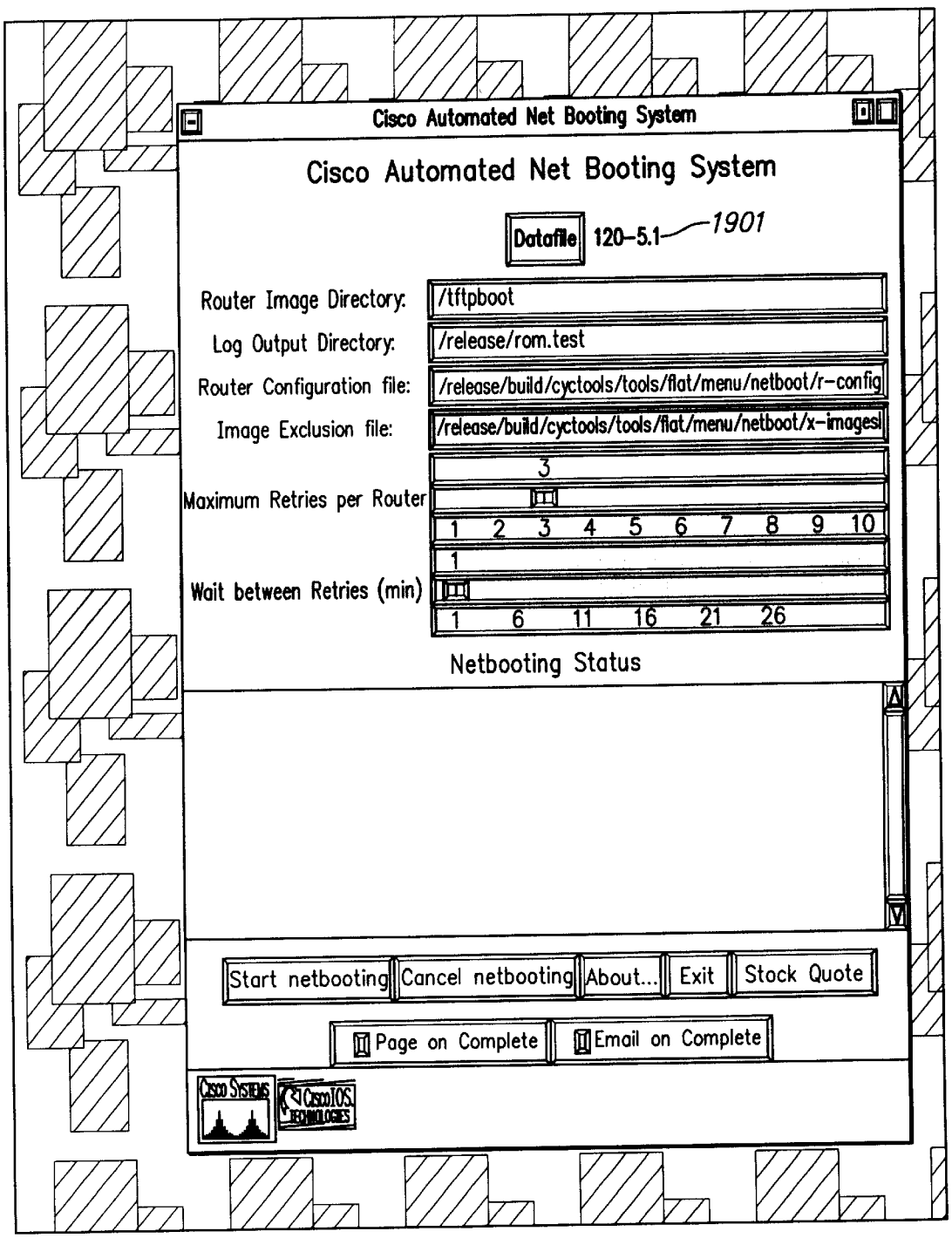
Figure 10:
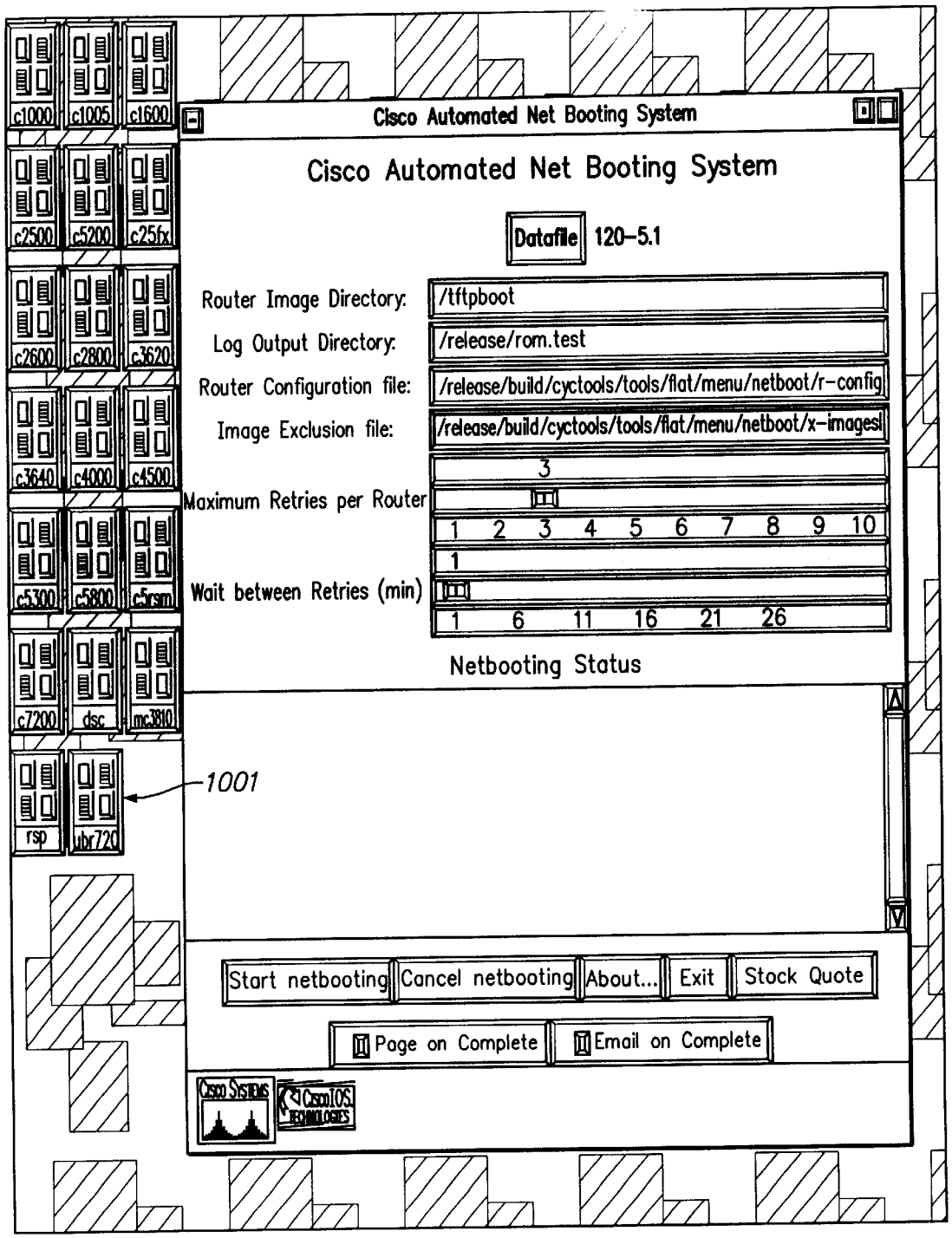
Figure 11:
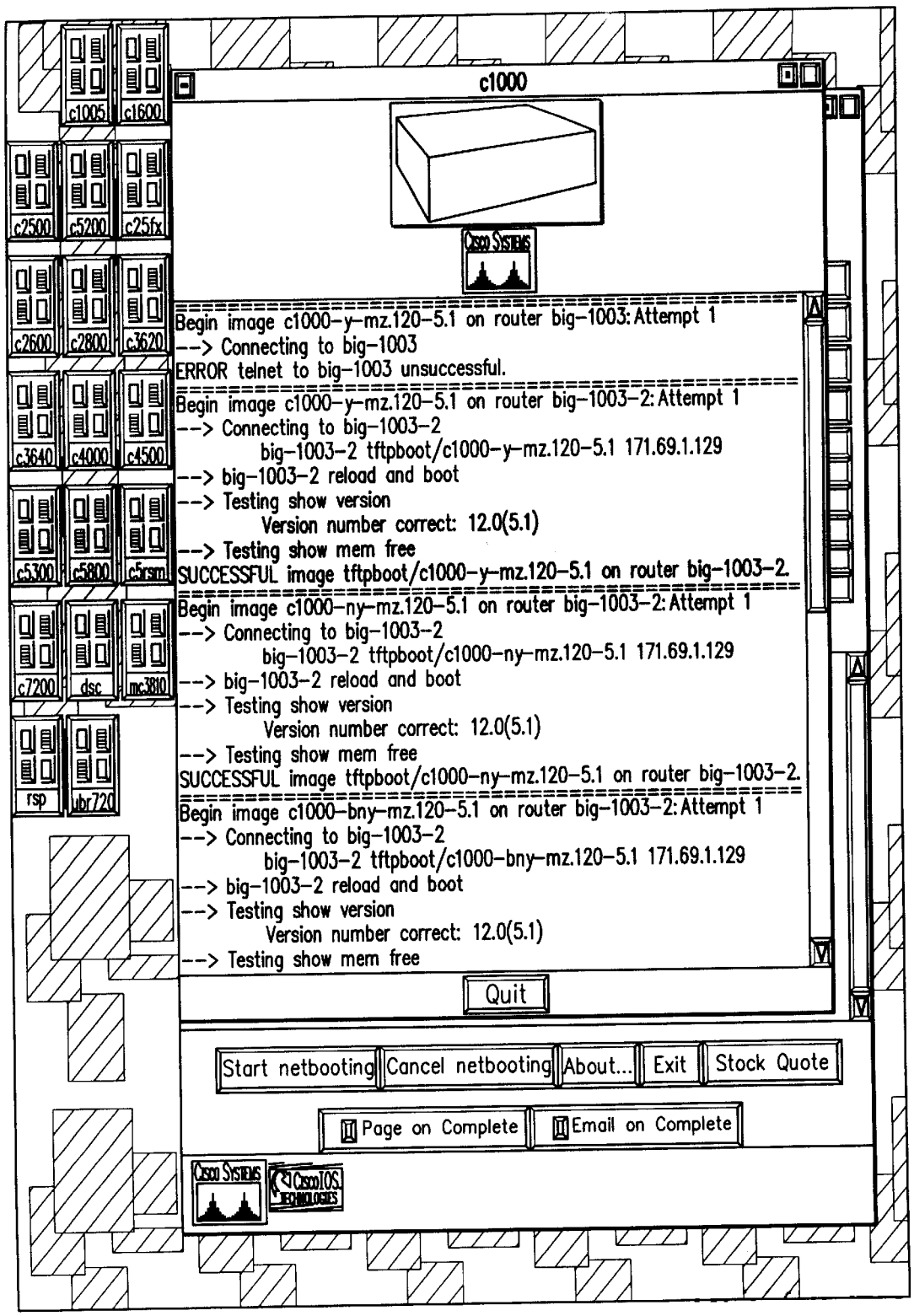
Figure 12:
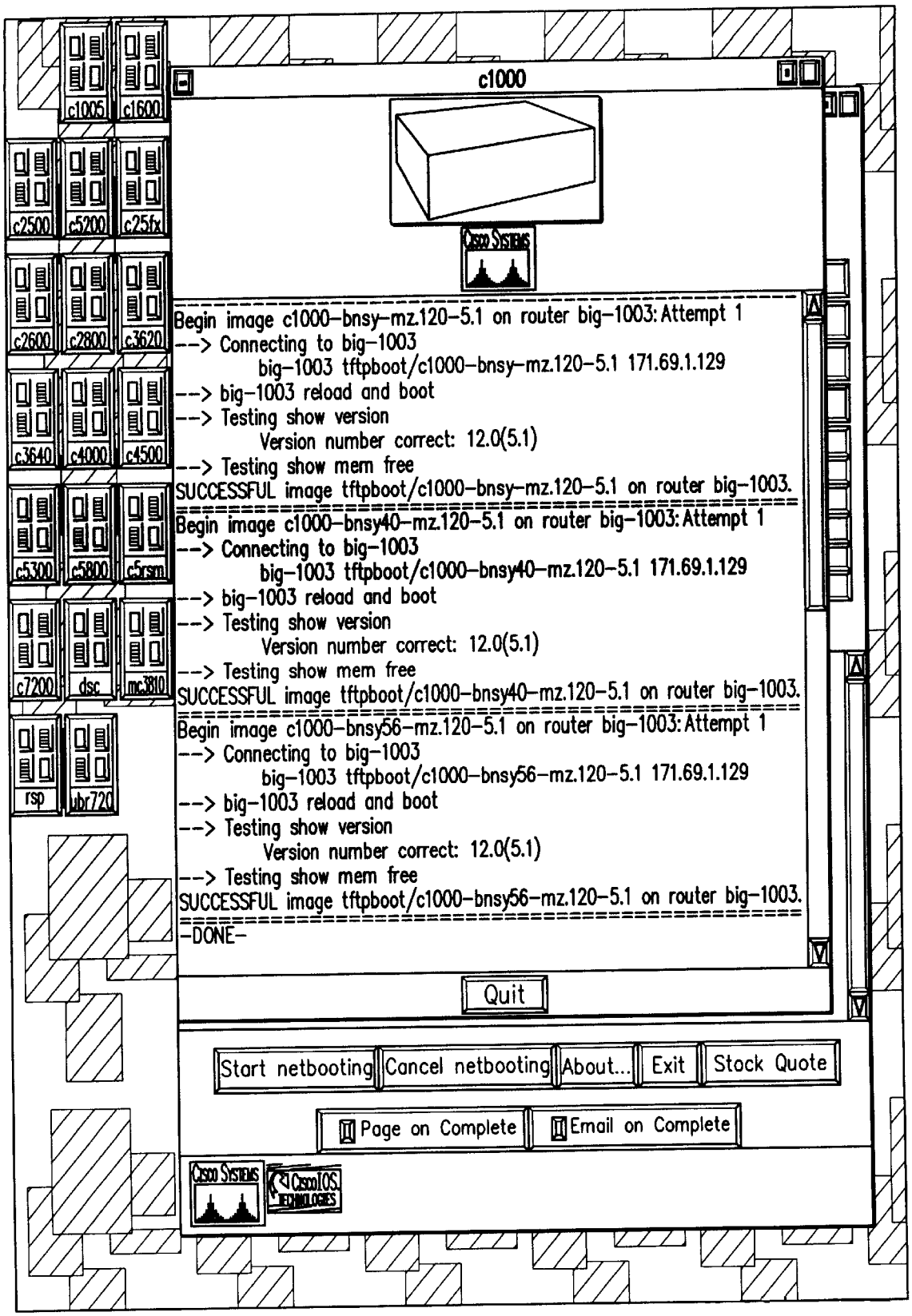

FIGS. 7 through 12 provide an example of the use of the present invention, illustrating through various screen shots. In FIG. 7 the main screen of the Automated Net Booting System 700 is displayed. As indicated above in the description of the invention in FIG. 5, the test engineer enters preliminary data for the router image directory 701, for the location of the "log output directory" 703, for the Router configuration file 705, and for the Image exclusion file 707. The test engineer also sets the Maximum Retries per Router 709 using the slidebar and sets the Wait between retries value 711 also using a slidebar. In making the selection for the data file image directory the test engineer depresses the "datafile" button 713 in FIG. 7 which displays a file selection box as shown in FIG. 8. Having made a selection from the file selection box (for example, file "120-5.1") the selection is displayed next to the "datafile" button as shown at 1901 in FIG. 9. After the entries have been made as described above, the test engineer depresses the "start netbooting" button 715 in FIG. 7. The system then starts parallel processes each of which has a status window associated with it. In the exemplary case there are 20 such processes running and their status windows are show in icon form 1001 in FIG. 10. A sample status window showing booting status in progress for platform c1000 images is shown in FIG. 11. In FIG. 12 is shown this status window for c1000 images indicating that testing of the c1000 platform images are complete. A sample output file listing for a c1000 platform image with a name "c1000-y-mz.120-5. " is shown in Appendix 1.

Having described the invention in terms of a preferred embodiment, it will be recognized by those skilled in the art that various types of general purpose computer hardware may be substituted for the configuration described above to achieve an equivalent result. Similarly, it will be appreciated that arithmetic logic circuits are configured to perform each required means in the claims for applications which process and control the automated net booting process for testing multiple IOS images for a specific release of the IOS software described. It will be apparent to those skilled in the art that modifications and variations of the preferred embodiment are possible, such as different processes for accessing or designating images to be tested, for accessing or designating platforms for use in testing, and for collecting and reporting of specific test data resulting from such tests, all of which fall within the true spirit and scope of the invention as measured by the following claims.

We claim:

1. An automated method for net boot testing a multiplicity of computer program images, using a computer having a processor, a memory, input and output connections and a display, the computer being coupled to the internet and to a test bed having one or more platforms on which to test the images, the method comprising the steps of:
   a. receiving user input to schedule a multiplicity of computer program images for testing by specifying a single path in a hierarchical directory system;
   b. selecting a file containing a list of available platforms in the test bed;
   c. successively selecting each image from the directory;
   d. successively selecting each platform from the list that can be used for testing a selected image;
   e. automatically booting a selected platform; and
   f. testing the loading of said selected image via the internet into said selected platform.

2. The automated method for net boot testing a multiplicity of computer program images of claim 1 wherein the computer program images are operating system images.

3. The automated method for net boot testing a multiplicity of computer program images of claim 1 wherein some of the images in the directory may be specifically excluded from testing.

4. The automated method for net boot testing a multiplicity of computer program images of claim 1 comprising an additional step of trying to boot load said selected image into said selected platform containing one or more routers a designated number of times the load is attempted for each router, and issuing a no-load message for each failed boot attempt for said selected image.

5. The automated method for net boot testing a multiplicity of computer program images of claim 1 comprising an additional step of writing a version report upon testing the loading of said selected image into said selected platform.

6. The automated method for net boot testing a multiplicity of computer program images of claim 5 comprising an additional step of writing a free memory report upon testing the loading of said selected image into said selected platform.

7. A system for automated net boot testing of a multiplicity of computer program images comprising:
   a. a computer having a processor, a memory, input and output connections and a display, the computer being coupled to the internet;
   b. a test bed having one or more platforms on which to test the images, the test bed being coupled to the computer;
   c. logic in the computer for receiving user input to schedule a multiplicity of computer program images for testing by specifying a single path in a hierarchical directory system;
   d. logic in the computer for selecting a file containing a list of available platforms in the test bed;
   e. logic in the computer for successively selecting each image from the directory;
   f. logic in the computer for successively selecting each platform from the list that can be used for testing a selected image;
   g. logic in the computer for automatically booting a selected platform; and
   h. logic in the computer for testing the loading of said selected image via the internet into said selected platform.

8. The system of claim 7 wherein the computer program images are operating system images.

9. The system of claim 7 wherein some of the images in the directory may be specifically excluded from testing.

10. The system of claim 7 comprising logic in the computer for trying to boot load said selected image into said selected platform containing one or more routers a designated number of times the load is attempted for each router, and issuing a no-load message for each failed boot attempt for said selected image.

11. The system of claim 7 comprising logic in the computer for writing a version report upon testing the loading of said selected image into said selected platform.

12. The system of claim 11 comprising logic in the computer for writing a free memory report upon testing the loading of said selected image into said selected platform.

13. A system for automated net boot testing of a multiplicity of computer program images comprising:
   a. a computer having a processor, a memory, input and output connections and a display, the computer being coupled to the internet;
   b. a test bed having one or more platforms on which to test the images, the test bed being coupled to the computer;
   c. means for receiving user input to schedule a multiplicity of computer program images for testing by specifying a single path in a hierarchical directory system;
   d. means for selecting a file containing a list of available platforms in the test bed;
   e. means for successively selecting each image from the directory;
   f. means for successively selecting each platform from the list that can be used for testing a selected image;
   g. means for automatically booting a selected platform; and
   h. means for testing the loading of said selected image via the internet into said selected platform.

14. A computer-readable medium carrying one or more sequences of instructions for net boot testing a multiplicity of computer program images, wherein execution of the one or more sequences of instructions by one or more processors causes the one or more processors to perform the steps of:
   a. receiving user input to schedule a multiplicity of computer program images for testing by specifying a single path in a hierarchical directory system;
   b. selecting a file containing a list of available platforms in a test bed having one or more platforms on which to test the images;
   c. successively selecting each image from the directory;
   d. successively selecting each platform from the list that can be used for testing a selected image;
   e. automatically booting a selected platform; and
   f. testing the loading of said selected image via the internet into said selected platform.

15. The computer-readable medium recited in claim 14, wherein the multiplicity of computer program images are operating system images.

16. The computer-readable medium recited in claim 14, wherein some of the images in the directory may be specifically excluded from testing.

17. The computer-readable medium recited in claim 14, in which execution of the one or more sequences of instructions further causes the one or more processors to perform the step of trying to boot load said selected image into said selected platform containing one or more routers a designated number of times the load is attempted for each router, and issuing a no-load message for each failed boot attempt for said selected image.

18. The computer-readable medium recited in claim 14, in which execution of the one or more sequences of instructions further causes the one or more processors to perform the step of writing a version report upon testing the loading of said selected image into said selected platform.

19. The computer-readable medium recited in claim 18, in which execution of the one or more sequences of instructions further causes the one or more processors to perform the step of writing a free memory report upon testing the loading of said selected image into said selected platform.

20. The computer-readable medium recited in claim 14, in which execution of the one or more sequences of instructions further causes the one or more processors to perform the step of creating a list containing the multiplicity of computer program images to be tested.

* * * * *